US006893062B2

United States Patent
Amano et al.

(10) Patent No.: US 6,893,062 B2
(45) Date of Patent: May 17, 2005

(54) BUMPER BEAM FOR AUTOMOBILES

(75) Inventors: Keiji Amano, Susono (JP); Yoshiya Suzuki, Mishima (JP); Hideo Kozuma, Zama (JP)

(73) Assignees: Mitsubishi Aluminum Co., Ltd., Tokyo (JP); Unipres Corporation, Fuji (JP)

( * ) Notice: Subject to any disclaimer, the term of this patent is extended or adjusted under 35 U.S.C. 154(b) by 19 days.

(21) Appl. No.: 10/690,576

(22) Filed: Oct. 23, 2003

(65) Prior Publication Data

US 2004/0084910 A1 May 6, 2004

(30) Foreign Application Priority Data

| Nov. 1, 2002 | (JP) | ............................. 2002-320452 |
| Dec. 25, 2002 | (JP) | ............................. 2002-374808 |

(51) Int. Cl.$^7$ ............................................. B60R 19/02
(52) U.S. Cl. ........................................ 293/102; 293/120
(58) Field of Search ........................... 293/102, 120, 293/122

(56) References Cited

U.S. PATENT DOCUMENTS

| 4,018,466 | A |   | 4/1977  | Norlin |          |
| 5,340,178 | A | * | 8/1994  | Stewart et al. | .............. 293/122 |
| 6,003,912 | A | * | 12/1999 | Schonhoff et al. | .......... 293/122 |
| 6,209,934 | B1| * | 4/2001  | Sakuma et al. | ............. 293/120 |
| 6,343,820 | B1|   | 2/2002  | Pederson |       |
| 6,467,831 | B1| * | 10/2002 | Mori et al. | ................. 296/102 |
| 6,502,874 | B2| * | 1/2003  | Kajiwara et al. | ........... 293/133 |

FOREIGN PATENT DOCUMENTS

| DE | 3144844     | * 11/1981 |
| DE | 195 09 541  |   9/1996  |
| EP | 0 718 157   |   6/1996  |
| JP | 58-78844    | * 5/1983  |
| JP | 8-80789     |   3/1996  |
| JP | 2001-114044 |   4/2001  |

* cited by examiner

*Primary Examiner*—Joseph D. Pape
(74) *Attorney, Agent, or Firm*—Oblon, Spivak, McClelland, Maier & Neustadt, P.C.

(57) ABSTRACT

A bumper beam for automobiles is composed in cross section of a top wall, a bottom wall opposed to the top wall, a pair of lateral walls connecting the top and bottom walls at opposite ends, one of the lateral walls being a collision side lateral wall and the other a vehicle-mounted side lateral wall, and a connection rib provided intermediate between the top and bottom walls and connecting the lateral walls. The collision side lateral wall is thicker than the vehicle-mounted side lateral wall, and both corners at opposite ends of the collision side lateral wall are curved with a radius of curvature R of 0.1–0.3 of the length of the collision side lateral wall and both corners at opposite ends of the vehicle-mounted side lateral wall are curved with a radius of curvature of 0.6–2.0 of the thickness of the vehicle-mounted side lateral wall. Alternatively, radius of curvature R may be 0.2–0.6 of the length of the bottom wall. Thicknesses of the top wall, the connection rib, and the bottom wall may become gradually greater or smaller in this order. The maximum load generated at the moment of collision is made as low as possible.

14 Claims, 14 Drawing Sheets

BUMPER BEAM FOR AUTOMOBILES

BACKGROUND OF THE INVENTION

1. Field of the Invention

The present invention relates to a bumper beam for reinforcing bumpers for automobiles.

2. Description of the Related Art

In general, an automotive bumper is composed of a bumper beam that is coupled to a body of an automobile and maintains strength of the bumper and a resin-made surface skin attached to the bumper beam to improve external appearance. Efforts have been made to lighten bumper beams to reduce fuel consumption, and in recent years bumper beams are in many cases formed from light alloys. For example, a bumper beam 60 shown in cross section in FIG. 12 is one example of a bumper beam extruded from aluminum alloy and has a hollow structure of "two-adjacent-square" cross section. In other words, the bumper beam 60 is comprised of top and bottom walls 61 and 62 parallel to each other, parallel lateral walls 63 and 64 that are perpendicular to the top and bottom walls 61 and 62, and a connection rib 65 provided intermediately so as to divide the lateral walls 63 and 64 into two.

In practical use, the bumper beam 60 is mounted through a side member 66 on the front or rear of an automobile body 67, and the lateral wall 63 constitutes, in a collision, a collision side lateral wall that receives an impact force F from a leftward direction as indicated by an arrow in the figure. Thus, of the members constituting the structure of the "two-adjacent-square" cross section, the lateral wall 63 is made the thickest. In the example of FIG. 12, the top wall 61, bottom wall 62 and connection rib 65 are formed with the same thickness to provide a structure whereby to equally receive and lessen the impact force from the leftward direction in the figure.

With a view to lightening, such a bumper beam is made of a high tensile aluminum alloy or the like. The bumper beam is usually attached with a cushioning made of foamed material or the like and its surface is covered with a bumper cover.

A bumper beam, when an external impact force is applied in an automobile collision or the like, absorbs the impact energy through plastic deformation of its material, thereby to avoid damage to other members and at the same time secure safety of an automobile occupant, and thus is an essential member.

Note that as patterns of automobile collisions, there can be mentioned a pattern in which a wall-like obstacle collides at a relatively high velocity against an overall wall surface of a bumper beam, and a pattern in which a columnar obstacle collides at a relatively low velocity against a part of a wall surface of a bumper beam. In many collisions of the former pattern, the collision energy involved is so great as to cause injuries to an automobile occupant as well as buckling damage to the bumper-beam mounting member. To cope with this, a bumper beam is desired which is capable of undergoing gradual deformation and collapse to absorb a large amount of collision energy. On the other hand, in many collisions of the latter pattern, the collision energy involved is seldom so great as to cause injuries to an automobile occupant and damage to the bumper-beam mounting member. In this case, such a bumper beam is desired which has high rigidity to resist deformation due to the load of collision rather than absorbs collision energy through deformation and collapse.

A bumper beam is required to have an increased bending rigidity of its sections and energy absorbing ability in case of bending, while at the same time to have lighter weight. A proposal has been made, for example, in Japanese Patent Application Unexamined Publication No. 8-80789 (see page 1; FIG. 2) that improves these characteristics through an improvement of the cross sectional shape of a bumper beam.

Here, a bumper beam is disclosed which is made of an aluminum alloy section of rectangular cross sectional shape uniform in its lengthwise direction and is mounted, at both ends of its automobile-body-facing wall surface, on an automobile body so as to have a vertical wall surface relative to the direction of collision. In this bumper beam, both corners of the aluminum alloy section located on the automobile body side are curved with a radius of curvature R which is 2.5 or more of the wall thickness.

More specifically, as shown in FIG. 13, the proposed bumper beam 70 is made of an aluminum alloy section sheathed in a bumper cover and has an automobile-body side wall surface 71a supported through a side member 74 on an automobile body 72. The aluminum alloy section as mentioned above has a rectangular "two-adjacent-square" cross-sectional shape which is uniform in the lengthwise direction and is composed of a pair of horizontal ribs 71b and 71b, vertical ribs 71a and 71a connected to both ends of the horizontal ribs 71b and 71b, and a reinforcement rib 71c interconnecting the vertical ribs 71a and 71a.

In the bumper beam 70, it is arranged that the vertical ribs 71a and 71a are perpendicular to the direction of collision and the horizontal ribs 71b and 71b are parallel to the direction of collision. The corners 71d and 71d on the side of the automobile body 72 are curved with a radius of curvature R which is 2.5 or more of the wall thickness within the confines of ⅙ or less of the length of the vertical ribs 71a and 71a. The corners 71e and 71e of the bumper beam 70 on the collision side are curved with a radius of curvature r approximately as large as the wall thickness. With the thus constructed bumper beam 70, at the time of collision against a barrier, the curved corners 71d and 71d are positioned at a starting point of buckling, thereby to accelerate buckling and effectively absorb collision energy while suppressing the load generated. Furthermore, at the time of collision against a pole, the curved corners 71d and 71d are positioned on a side opposite a starting point of buckling, thereby to allow a large load to be generated. The reason for limiting the radius of curvature R to ⅙ or less of the length of the vertical ribs 71a and 71a is that, if the radius of curvature R exceeds ⅙, it becomes difficult to mount on the side member 74 and a reduction is made in the energy absorbed.

It is hoped that such a structure realizes both characteristics as needed to cope with the above-mentioned two patterns of collisions, i.e., the characteristic of undergoing gradual deformation and collapse to absorb a large amount of collision energy and the characteristic of having rich rigidity to resist deformation due to the load of collision.

If a bumper beam, however, is too strong, damage will be caused to a side member, the mounting hardware for the bumper beam, along with the buckling of the bumper beam. The side member will be damaged by the maximum load generated at the moment of collision.

For example, with the bumper beam as shown in cross section in FIG. 12 which has all the corners bent at right angles, the average load during the collision-caused plastic deformation of the bumper beam from 3.5–4.5 mm is approximately 50 kN as shown in FIG. 14, while a maximum load of 250 kN is generated during the plastic deformation of the bumper beam of approximately 0.5 mm, before the amount of displacement of the bumper beam reaches 1 mm immediately after the collision. The deformation proceeds under a substantially constant crushing load after deformation up to approximately 2 mm. In this case, the maximum load is 5.88 of the average load.

If this maximum load can be reduced without impairment of the energy-absorbing ability of the bumper beam, collision energy will be absorbed, without damaging the side member, only by deformation and collapse of the bumper beam.

Conventionally, the matter of concern was the relationship between the maximum load and the energy absorbed during the plastic deformation of the bumper beam from 3.5 to 4.5 mm, i.e., at the time when the generated load shows no substantial fluctuations, and no attempts have been made to reduce the maximum load generated at the moment of collision.

SUMMARY OF THE INVENTION

The present invention has been made under such circumstances, and accordingly, it is an object of the present invention to provide a bumper beam which enables maximum reduction of the peak of the maximum load generated at the moment of collision without impairment of the energy-absorbing ability of the bumper beam, and which enables preventing a side member, the mounting hardware for the bumper beam, from being damaged.

With a view to solving the above problem, an extensive study was made on cross sectional shapes for automobile bumper beams, and with a bumper beam specimen 100 mm long used. When an instantaneously generated high load applied to the specimen exceeded a crushing load of an automobile body, a side member became damaged. It was found that, by making the maximum load that is generated at the moment of collision substantially equal to this automobile-body crushing load, collision energy may be absorbed through plastic deformation of the bumper beam without damaging the side member. It was also found out that, if the maximum load is lowered with the structure of a bumper beam maintained the same as before, a structure will result by which the impact load generated in the latter part of a collision becomes too low, thereby deteriorating the energy absorbing performance as a bumper beam.

Thus, referring to the crush displacement amount—crush load curve as shown in FIG. 14, if only the maximum peak is reduced and the wave form is made closer to a rectangular wave form, collision energy will be able to be absorbed through plastic deformation of the bumper beam without damaging the side member, thereby to provide a bumper beam having a stable energy-absorbing performance. Under these conditions, as a result of an extensive study on bumper-beam cross-sectional shapes, the present invention has been made based on the finding that the above object may be attained by thickening a member carrying an impact-receiving surface and imparting a specific radius of curvature to both ends of the member carrying the impact-receiving surface, or by thickening the member carrying the impact-receiving surface, varying the thicknesses of the members extending perpendicular to the impact-receiving-surface, and imparting a specific radius of curvature to both ends of the impact-receiving-surface carrying member.

More specifically, according to one aspect of the present invention, there is provided a bumper beam for an automobile comprising in cross section: a top wall; a bottom wall opposed to the top wall; a pair of lateral walls connecting the top wall and the bottom wall at opposite ends, one of the pair of lateral walls being a collision-surface side lateral wall and the other being a vehicle-mounted-surface side lateral wall, and a connection rib provided intermediate between the top wall and the bottom wall and connecting the pair of lateral walls, wherein a thickness of the collision-surface side lateral wall is greater than a thickness of the vehicle-mounted-surface side lateral wall, and wherein both corners at opposite ends of the collision-surface side lateral wall are curved with a radius of curvature R of 0.1–0.3 of a length of the collision-surface side lateral wall, and both corners at opposite ends of the vehicle-mounted-surface side lateral wall are curved with a radius of curvature r of 0.6–2.0 of the thickness of the vehicle-mounted-surface side lateral wall.

This cross sectional shape is advantageously employable when the length $L_1$ of the collision-surface side lateral wall is smaller than twice the length $L_2$ of the top wall and the bottom wall.

According to another aspect of the present invention, there is provided a bumper beam for an automobile comprising in cross section: a top wall; a bottom wall opposed to the top wall; a pair of lateral walls connecting the top wall and the bottom wall at opposite ends, one of the pair of lateral walls being a collision-surface side lateral wall and the other being a vehicle-mounted-surface side lateral wall, and a connection rib provided intermediate between the top wall and the bottom wall and connecting the pair of lateral walls, wherein a thickness of the collision-surface side lateral wall is greater than a thickness of the vehicle-mounted-surface side lateral wall, and wherein both corners at opposite ends of the collision-surface side lateral wall are curved with a radius of curvature R of 0.2–0.6 of a length of the bottom wall, and both corners at opposite ends of the vehicle-mounted-surface side lateral wall are curved with a radius of curvature r of 0.6–2.0 of the thickness of the vehicle-mounted-surface side lateral wall.

By thus constructing a bumper beam, the peak of the maximum load that is generated at the moment of collision may be effectively lowered, and collision energy may be absorbed by the bumper beam without damaging the side member, thereby greatly reducing possible injuries to automobile occupants.

This cross sectional shape is advantageously employable when the length $L_1$ of the collision-surface side lateral wall is greater than twice the length $L_2$ of the top wall and the bottom wall.

In the present invention, the top wall, the connection rib and the bottom wall may be substantially equal in thickness.

Preferably, in the case where the connection rib is thinner than the bottom wall, the thickness of the connection rib is 0.6–1.0 of the thickness of the bottom wall.

By thus constructing the connection rib, the bumper beam may have a high rigidity while at the same time markedly reducing the maximum peak load generated at the time of collision.

Preferably, the radius of curvature R of both corners at opposite ends of the collision-surface side lateral wall is 10–30 mm, which is the most practical value from a viewpoint of a marked reduction in the maximum peak load and ease with which to extrude the bumper beam.

According to still another aspect of the present invention, there is provided a bumper beam for an automobile comprising in cross section: a top wall; a bottom wall opposed to the top wall; a pair of lateral walls connecting the top wall and the bottom wall at opposite ends, one of the pair of lateral walls being a collision-surface side lateral wall and the other being a vehicle-mounted-surface side lateral wall, and a connection rib provided intermediately between the top wall and the bottom wall and connecting the pair of lateral walls, wherein a thickness of the collision-surface side lateral wall is greater than a thickness of the vehicle-mounted-surface side lateral wall wherein thicknesses of the top wall, the connection rib, and the bottom wall become gradually greater or smaller in this order, and wherein both corners at opposite ends of the collision-surface side lateral wall are curved with a radius of curvature R of 0.05–0.3 of a length of the collision-surface side lateral wall.

Preferably, the thickness of the top wall is 0.8 or more and less than 0.9 of the thickness of the bottom wall, and the thickness of the connection rib is 0.9 or more and less than 1.0 of the thickness of the bottom wall.

Alternatively, it is preferable that the thickness of the bottom wall is 0.8 or more and less than 0.9 of the thickness of the top wall, and the thickness of the connection rib is 0.9 or more and less than 1.0 of the top wall.

By thus constructing the connection rib, the bumper beam may have a high rigidity while at the same time markedly reducing the maximum peak load generated at the time of collision and collision energy may be absorbed by the bumper beam without damaging the side member, thereby greatly reducing possible injuries to automobile occupants.

In the present invention, the connection rib may be provided off-centered toward the bottom wall or toward the top wall rather than at an intermediate height of the pair of lateral walls.

By thus off-centering the connection rib, even if the center line of the bumper beam does not coincide with, and is located at a position higher or lower than, the center line of the side member from a standpoint of designing an automobile, a bottom portion of the bumper beam which may receive strong impact energy may be reinforced.

Preferably, in the case where the connection rib is provided off-centered toward the bottom wall, the top wall, the connection rib, and the bottom wall become gradually thicker in this order.

In contrast, in the case where the connection rib is provided off-centered toward the top wall, the top wall, the connection rib and the bottom wall preferably become gradually thinner in this order.

Preferably, the bumper beam comprises an extrusion of an aluminum alloy.

The above and other objects and features of the present invention will become more apparent from the following description taken in conjunction with the accompanying drawings, in which like members or elements are basically given like reference characters.

DETAILED DESCRIPTION OF THE PREFERRED EMBODIMENTS

Preferred embodiments of the present invention will now be described with reference to the accompanying drawings in which each member or element is not necessarily accurately drawn to scale for the sake of clarity.

First Embodiment

Figure 1:
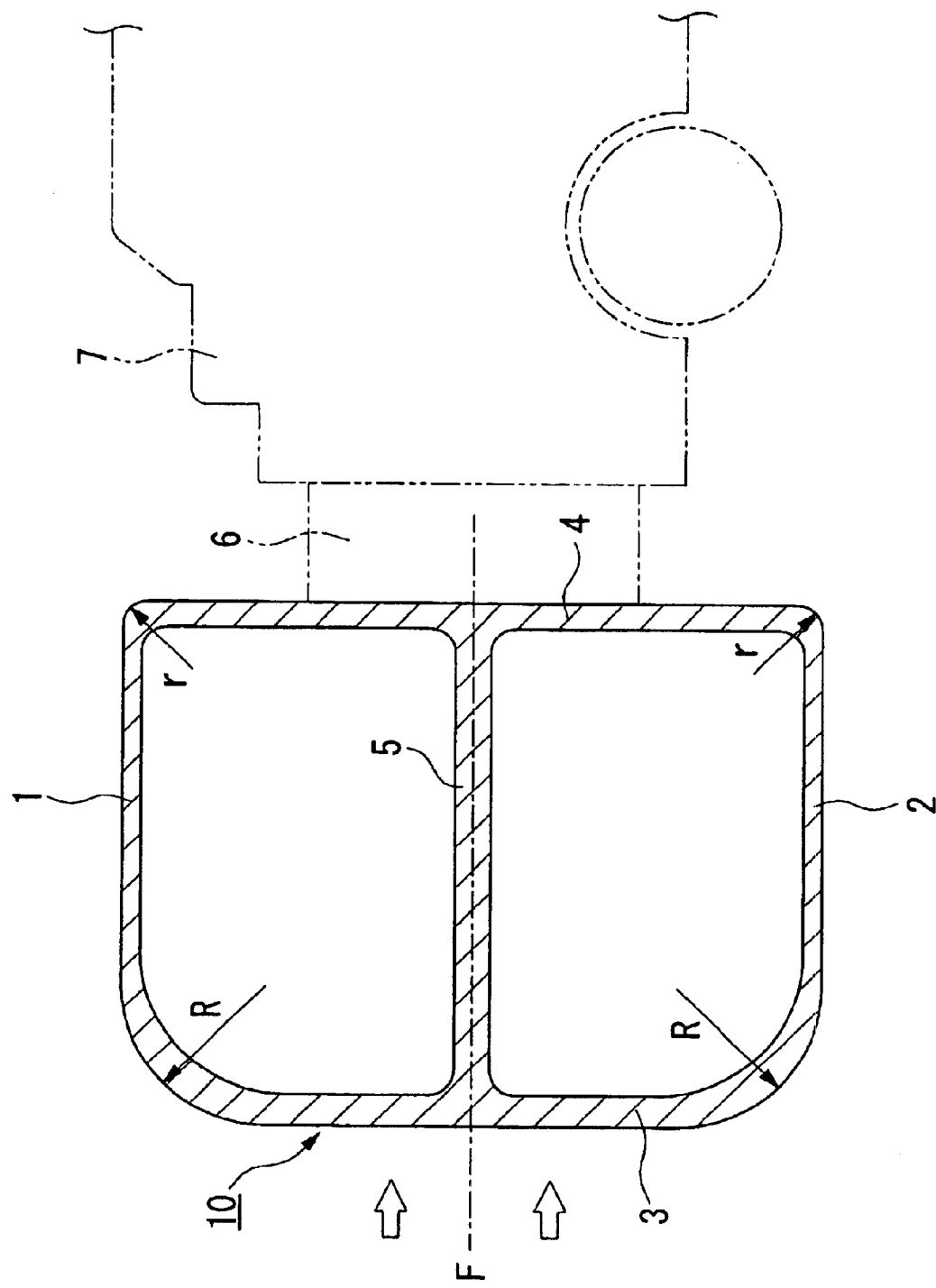
FIG. 1 is view showing a cross sectional shape of an automotive bumper beam according to a first embodiment of the present invention.

FIG. 1 is a cross sectional view of a bumper beam according to a first embodiment of the present invention. As shown, the bumper beam 10 of this embodiment has a "two-adjacent-square" cross sectional shape and is comprised in cross section of a top wall 1, a bottom wall 2 opposed to the top wall 1, a pair of lateral walls 3 and 4 connecting the top and bottom walls 1 and 2 at opposite ends, and a connection rib 5 provided intermediate between the top and bottom walls 1 and 2 to connect the pair of lateral walls 3 and 4, so as to secure rigidity. In the bumper beam 10, the lateral wall 3 on the left in the figure is the collision-surface side lateral wall, and an impact force F is applied thereto in a collision as indicated by an arrow. The lateral wall 4 on the right in the figure is the automobile-body-mounted-surface side lateral wall and is mounted on an automobile body 7 through a side member 6. FIG. 1 shows the case where the length of the lateral walls 3 and 4 is smaller than twice the length of the top and bottom walls 1 and 2, and where all of the top wall 1, bottom wall 2, and connection rib 5 have an equal thickness.

Figure 2:
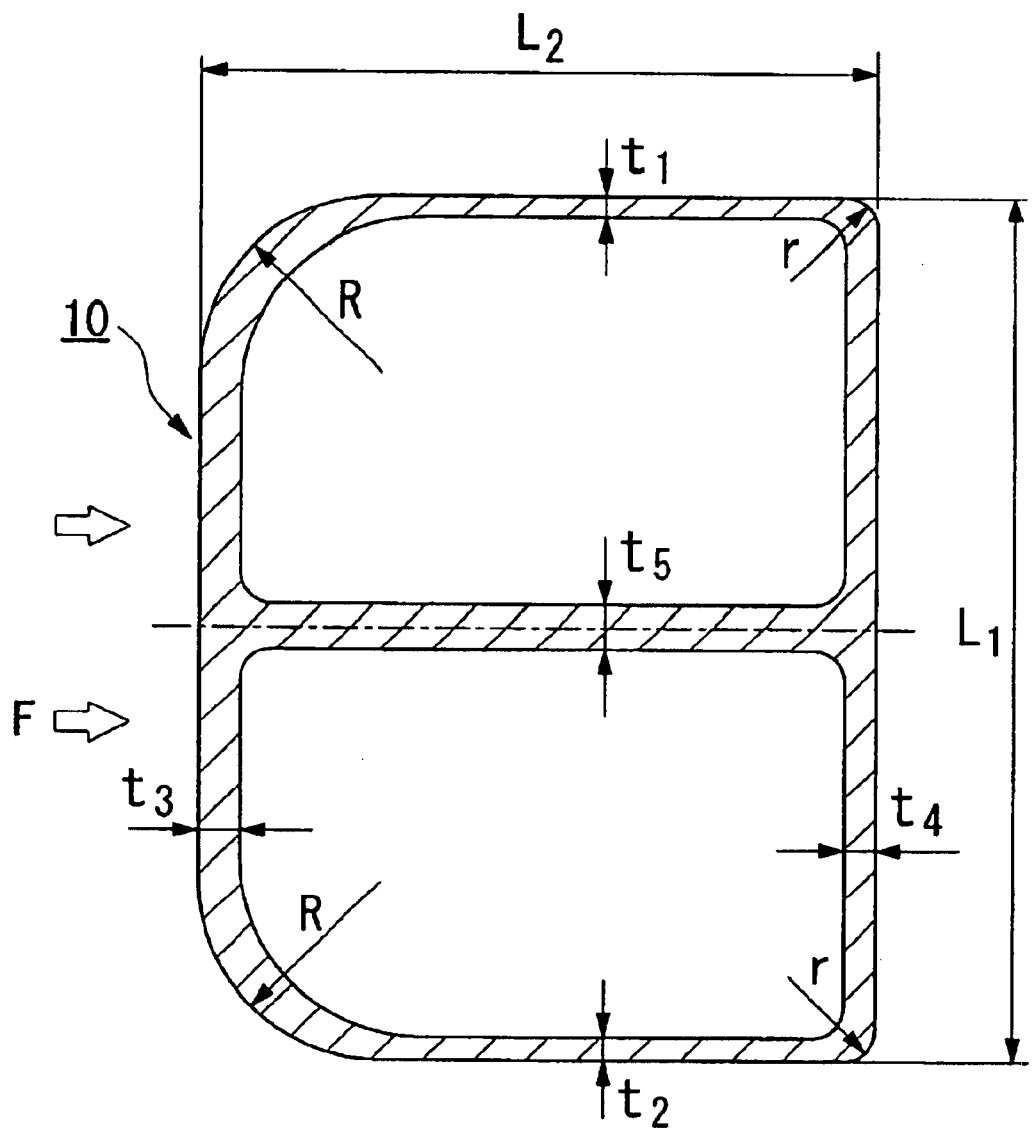
FIG. 2 is a view showing dimensions of each part of an automotive bumper beam of the present invention.

FIG. 2 is a view showing the dimension of each part of a bumper beam of the present invention, wherein $L_1$ indicates the length of the lateral walls, $L_2$ the length of the top wall, $t_3$ the thickness of the collision-surface side lateral wall, $t_4$ the thickness of the vehicle-body-mounted-surface side lateral wall, $t_1$ and $t_2$ the thicknesses of the top and bottom walls, respectively, and $t_5$ the thickness of the connection rib.

With FIG. 2 used, the relationship as mentioned above will be explained to be $L_1 < 2L_2$ and $t_1 = t_2 = t_5$.

In the present embodiment, the thickness of the collision-surface side lateral wall 3 is made greater than that of the vehicle-body-mounted-surface side lateral wall 4 to receive collision energy, and the top and bottom walls 1 and 2 and the intermediate connection rib 5 sharingly absorb the collision energy.

The thickness of each part for practical use may, for example, be approximately 2.0–3.0 mm for the top wall 1, bottom wall 2, and connection rib 5, 2.0–4.5 mm for the collision-surface side lateral wall 3, and 2.0–3.5 mm for the vehicle-mounted-surface side lateral wall 4.

To describe with the dimensions in FIG. 2, in the present first embodiment $t_3 > t_4$ and $t_1 = t_2 = t_5$, and their suitable values may be $t_3 = 2.0$–$4.5$ mm, $t_4 = 2.0$–$3.5$ mm, and $t_1 = t_2 = t_5 = 2.0$–$3.0$ mm.

In the present embodiment, both corners at the upper and lower ends of the collision-surface side lateral wall 3 and both corners at the upper and lower ends of the lateral wall 4 are worked to curve with radii of curvature R and r, respectively. By imparting a curvature to each corner of the "two-adjacent-square" cross section, the peak of the maximum load generated at the moment of collision can be markedly lowered.

Although a radius of curvature, if very small, lowers the peak of the maximum load. it is practical from a viewpoint of material machining to impart a radius of curvature R approximately equal to or greater than the wall thickness of the top wall or the bottom wall. The greater the radius of curvature, the greater the effect of lowering the peak of the maximum load, but the effect will become saturated if too great a radius of curvature is employed. The suitable size of a radius of curvature relates to lengths of the walls constituting the "two-adjacent-square" cross section, and in the case where the length of the collision-surface side and vehicle-mounted-surface side lateral walls 3 and 4 is smaller than twice the length of the top and bottom walls 1 and 2 as shown in FIG. 1, the radius of curvature R may be 0.1 to 0.3 of the length of the collision-surface side lateral wall 3. In other words, where $L_1 < 2L_2$ and $t_1 = t_2 = t_5$ in FIG. 2, the radius of curvature R is preferably set to be:

$$R = (0.1-0.3) \times L_1 \tag{1}$$

Figure 3:
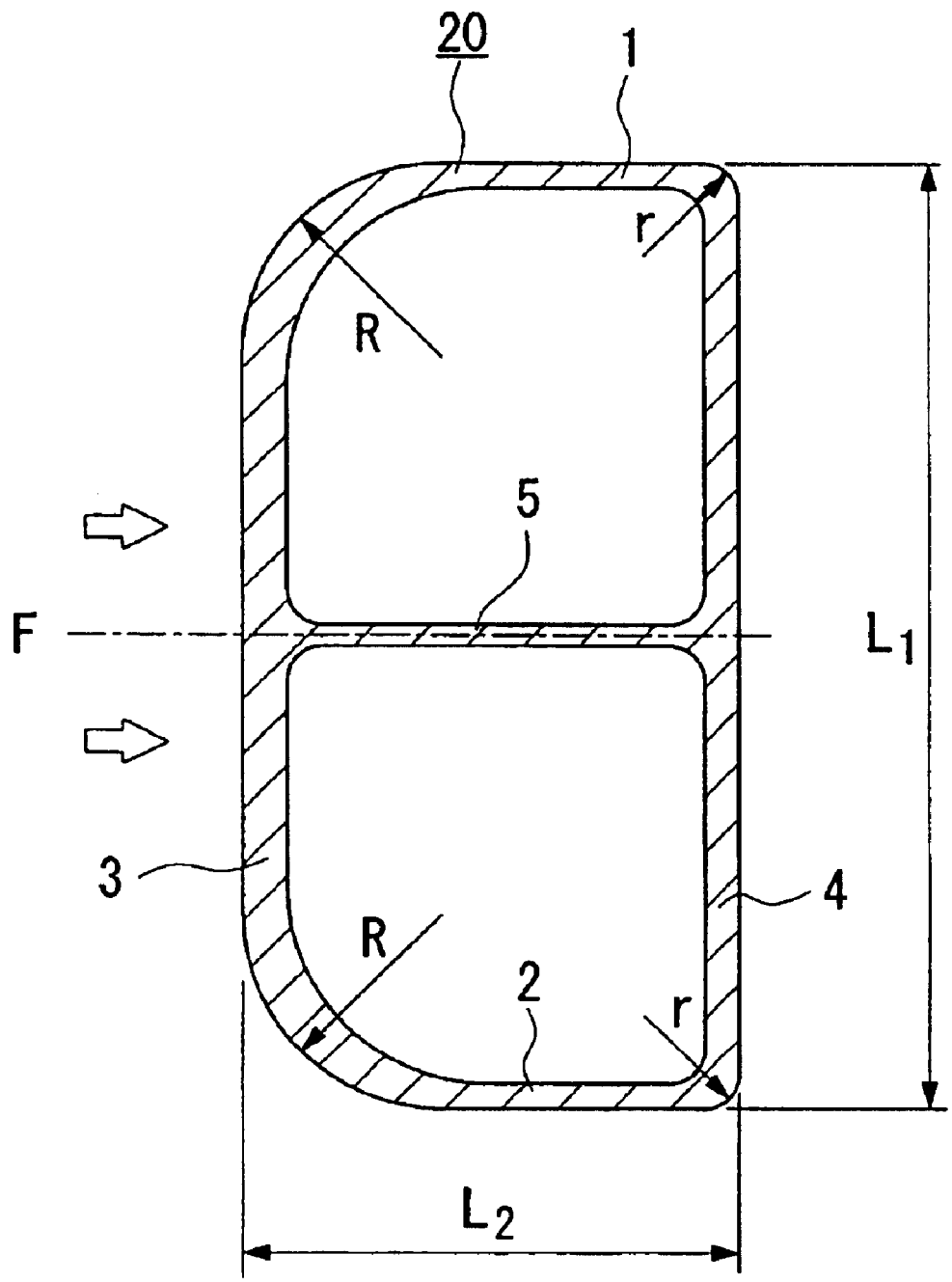
FIG. 3 is a view showing a cross sectional shape of an automotive bumper beam according to a second embodiment of the present invention.

FIG. 1 shows the case where the length of the collision-surface side and vehicle-mounted-surface side lateral walls 3 and 4 is smaller than twice the length of the top and bottom walls 1 and 2. Alternatively, as a means to adjust the crushing strength of a bumper beam, the length $L_1$ of the collision-surface side and vehicle-mounted-surface side lateral walls 3 and 4 may be made greater than twice the length $L_2$ of the top and bottom walls 1 and 2 as shown in FIG. 3. The thickness of each part as mentioned above is also applicable to this case, except that the radius of curvature needs to be changed as will be described below.

In the case where the length of the collision-surface side and vehicle-mounted-surface side lateral walls 3 and 4 is greater than twice the length of the top and bottom walls 1 and 2 as shown in FIG. 3, the radius of curvature R may be 0.6–1.0 of the length of the top and bottom walls 1 and 2. In other words, where $L_1 > 2L_2$ and $t_1 = t_2 = t_5$ in FIG. 2, the radius of curvature R may be:

$$R = (0.6-1.0) \times L_2 \tag{2}$$

Regarding the radius of curvature r for both corners at the upper and lower ends of the vehicle-mounted-surface side lateral wall 4, because of this side being free of direct impact and in consideration of working accuracy, a small radius of curvature on the order of the wall thickness of the lateral wall 4 will suffice. To describe using FIG. 2, the radius of curvature may be:

$$r = (0.6-2.0) \times t_4 \tag{3}$$

With the thus constructed bumper beam, the peak of the maximum load generated at the moment of collision may be effectively lowered.

A crushing experiment was conducted as follows. A bumper beam as shown in FIG. 1 was extruded from an aluminum alloy to have a "two-adjacent-square" cross-section and the dimensions: $t_3 = 4.5$ mm, $t_4 = 3.5$ mm, $t_1 = t_2 = t_5 = 2.6$ mm, $L_1 = 100$ mm and $L_2 = 75$ mm. The bumper beam was cut into specimens 100 mm long. which were crushed in the direction of collision as indicated by the arrow in FIG. 1. A relationship between the amount of displacement of the bumper beam and crush load was examined. The radii of curvature R were 0 mm, 5 mm, and 10 mm. The measurement results are shown in FIG. 4.

Figure 4:
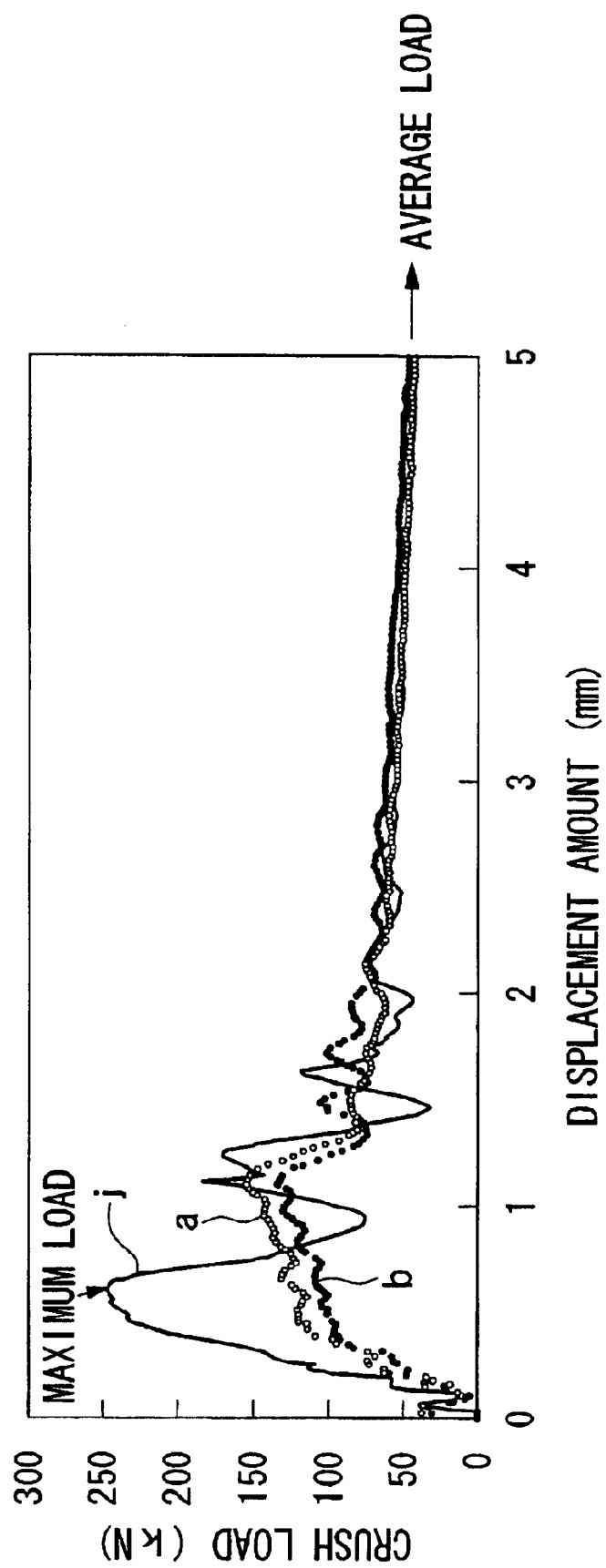
FIG. 4 is a view showing an example of a relationship between the amount of displacement of a bumper beam according to the first embodiment of the present invention and crush load.

As is apparent from FIG. 4, the maximum load is generated before the amount of displacement immediately after the collision reaches 1 mm, and thereafter the deformation proceeds under a substantially constant crush load. The curve j in FIG. 4 is a displacement amount curve for a bumper beam of "two-adjacent-square" cross section which has a radius of curvature R of 0 (with no radius of curvature) and indicates that the maximum load of 250 kN was generated when the amount of displacement was approximately 0.5 mm. In contrast, with the curve a for the radius of curvature R of 5 mm and the curve b for the radius of curvature R of 10 mm, a markedly lowered maximum load of approximately 150 kN was generated when the amount of displacement was about 1 mm. The curves a and b are thus closer to a rectangular wave form.

Thus, by imparting a radius of curvature R to opposite ends of the collision-surface side lateral wall of a bumper beam of "two-adjacent-square" cross section, the maximum load that is generated at the time of collision can be markedly reduced, and the bumper beam can effectively absorb the collision energy without causing damage to the side member, which is very effective for ensuring safety of the vehicle occupants.

Figure 5:
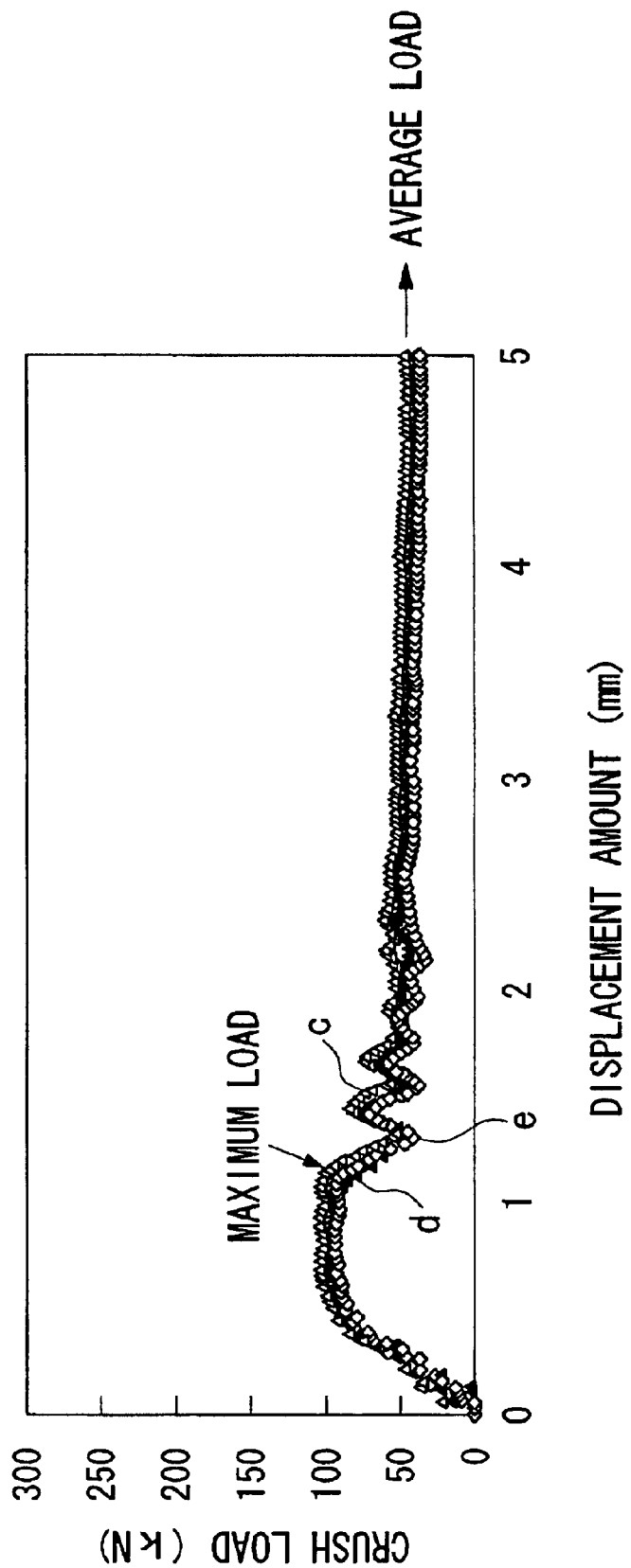
FIG. 5 is a view showing another example of a relationship between the amount of displacement of a bumper beam according to the first embodiment of the present invention and crush load.

FIG. 5 shows measurement results of maximum loads obtained with bumper beams having the same dimensions as mentioned above ($t_3 = 4.5$ mm, $t_4 = 3.5$ mm, $t_1 = t_2 = t_5 = 2.6$ mm, $L_1 = 100$ mm and $L_2 = 75$ mm), but having varied radii of curvature R of 20, 30 and 40 mm. In the figure, the curve c is for the case where the radius of curvature is 20 mm, the curve d is for the case where the radius of curvature R is 30 mm, and the curve e is for the case where the radius of curvature R is 40 mm.

As is apparent from the figure, with greater the radius of curvature R, the maximum load is further lowered to about 100 kN, making the curves closer to a rectangular wave form. If the radius of curvature R, however, exceeds 30 mm, the lowering of the maximum load approaches maximum. Consequently, the upper limit of R may suitably be set at 30 mm, while the lower limit of R may be approximately 10 mm at which the maximum load becomes approximately 100 kN or less. A more preferred range of R may be selected from within the range represented by the above equation (1). $R = (0.1-0.3) \times L_1$, and is 10–30 mm from a viewpoint of practical use.

Second Embodiment

Figure 6:
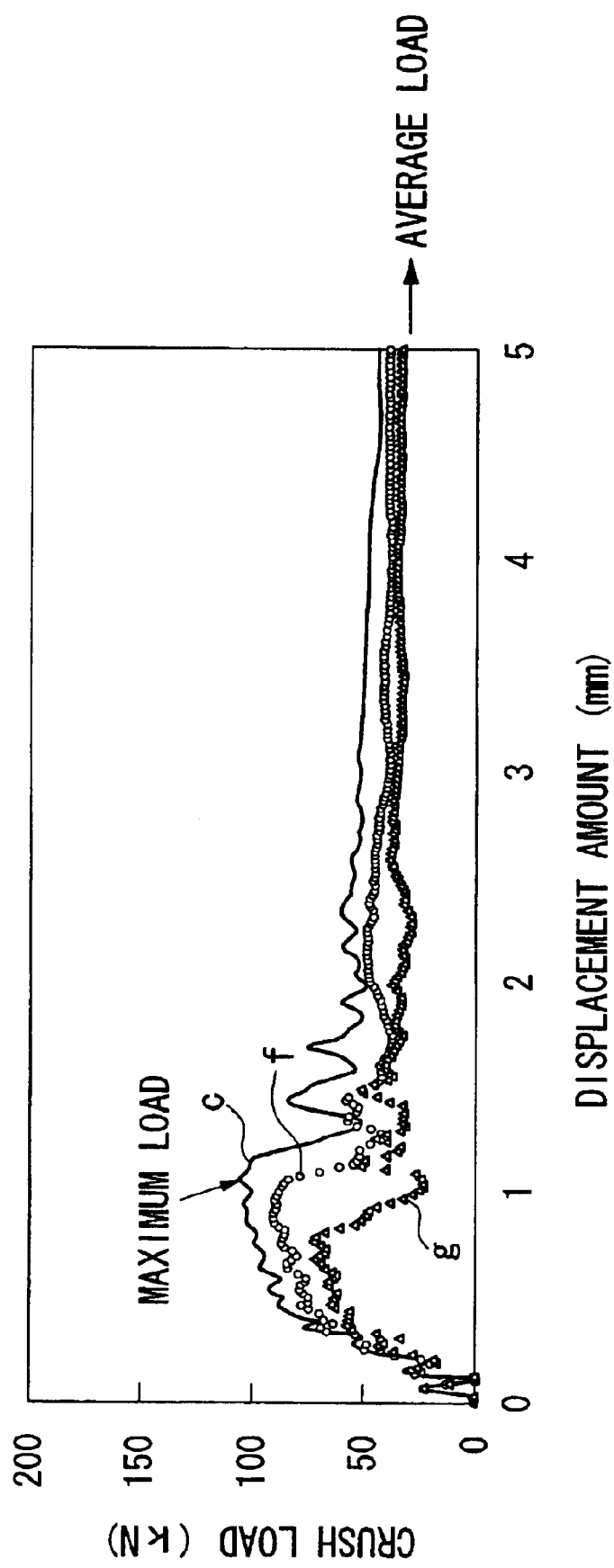
FIG. 6 is a view showing a relationship between the amount of displacement of a bumper beam according to the second embodiment of the present invention and crush load.

Next, a relationship between maximum load and displacement obtained with a bumper beam according to a second embodiment of the present invention is shown in FIG. 6, which is a variant to the first embodiment and in which the top and bottom walls 1 and 2 in the "two-adjacent-square" cross section have the same thickness, and the connection rib 5 has a smaller thickness. In other words, the dimensions of the "two-adjacent-square" cross section were the same as those in the first embodiment except that $t_5 < t_1 = t_2$. The radius of curvature R at opposite ends of the collision-surface side lateral wall was 20 mm.

In FIG. 6, the curve c is for the case as in the first embodiment in which the connection rib and the top and bottom walls had the same thickness ($t_5 = t_1 = t_2 = 2.6$ mm). The curve f is for the case where the thickness of the connection rib was reduced by 15% so as to provide $t_1 = t_2 = 2.6$ mm and $t_5 = 2.2$ mm. The curve g is for the case where the thickness of the connection rib was reduced by 30% so as to provide $t_1 = t_2 = 2.6$ mm and $t_5 = 1.8$ mm.

As is apparent from FIG. 6, in the case where the thickness of the connection rib was made smaller than that of the top and bottom walls, the maximum load is reduced with the thinning of the connection rib. This is presumably because an impact force is received in a direction along the connection rib, the connection rib with a reduced strength serves to lessen the impact force.

As a result of repeated collision experiments with bumper beams having connection ribs of various thicknesses, it has been found that the optimum thickness of the connection rib is most susceptible to the dimension of the top and bottom walls of the "two-adjacent-square" cross section. It has been found from the experiments that a suitable value for the thickness ($t_5$) of the connection rib in connection with the thickness $t_1$ (=$t_2$) of the top wall, in terms of the dimensions in FIG. 2, is:

$$t_5 = (0.6 - 1) \times t_1 \qquad (4)$$

COMPARATIVE EXAMPLE

Figure 7:
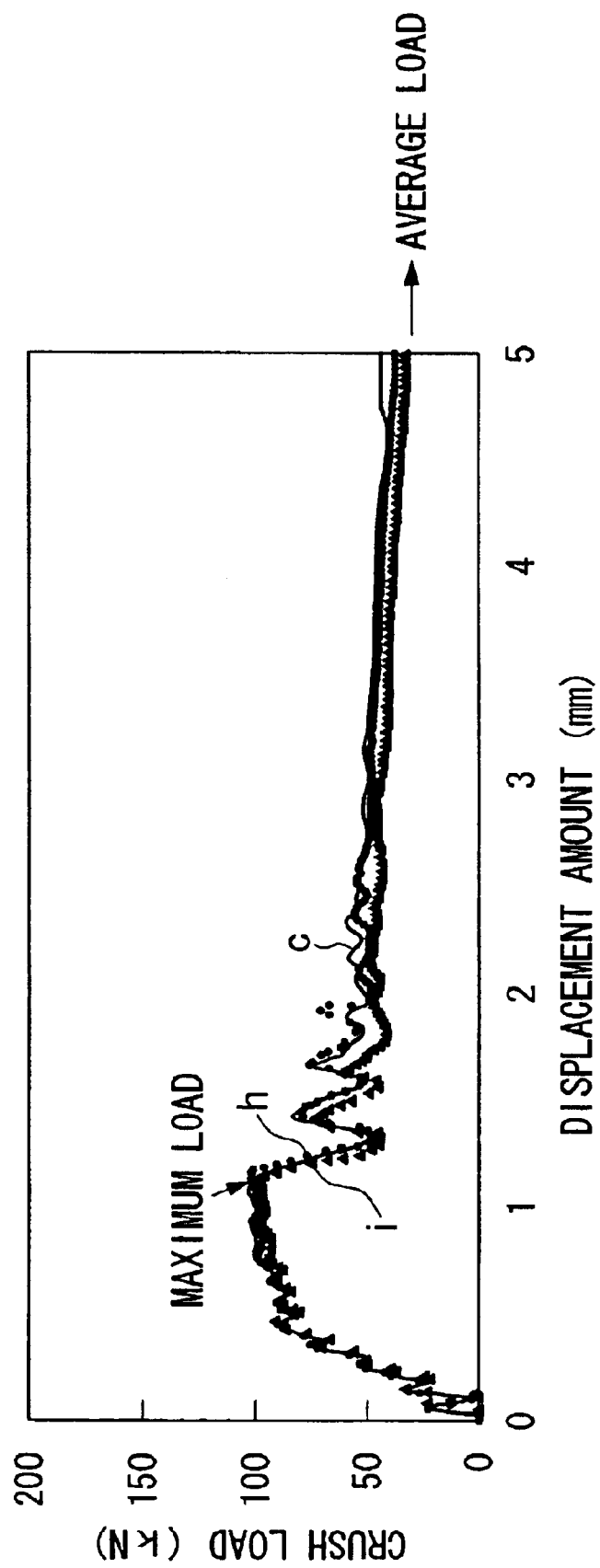
FIG. 7 is a view showing a relationship between the amount of displacement of a bumper beam of a comparative example and crush load.

Next, a relationship between maximum load and displacement obtained with a comparative example is shown in FIG. 7, in which the thickness of the connection rib in the "two-adjacent-square" cross section was made greater than the thickness of the top and bottom walls. In other words, the dimensions of the "two-adjacent-square" cross section were the same as those in the first embodiment, except that $t_5 > t_1 = t_2$. The radius of curvature R at opposite ends of the collision-surface side lateral wall was 20 mm.

In FIG. 7, the curve c is for the case as in the first embodiment in which the connection rib and the top and bottom walls had the same thickness ($t_5 = t_1 = t_2 = 2.6$ mm). The curve h in the figure is for the case where the thickness of the top wall was reduced by 15% as compared with the thickness of the connection rib so as to provide $t_1 = t_2 = 2.2$ mm and $t_5 = 2.6$ mm. The curve i is for the case where the thickness of the top wall was reduced by 30% as compared with the thickness of the connection rib so as to provide $t_1 = t_2 = 1.8$ mm and $t_5 = 2.6$ mm.

As is apparent from FIG. 7, in the case where the top and bottom walls were made thinner than the connection rib, the maximum load generated at the time of collision is lowered due to the effect of the radius of curvature R, but no change is observed in the maximum load depending on the degree of thinning the top and bottom walls. This is presumably because, although the top and bottom walls with a reduced strength lessen the impact force, it is that part of the connection rib which receives the impact force, and thus the maximum load is governed by the strength of the connection rib.

Experiment results with the bumper beams of the first embodiment in which the top and bottom walls and the connection rib have the same thickness are summarized in Table 1.

TABLE 1

|  | Radius of curvature R (mm) | | | | | |
| --- | --- | --- | --- | --- | --- | --- |
|  | 0 | 5 | 10 | 20 | 30 | 40 |
| Maximum load (kN) | 248 | 155 | 134 | 106 | 97 | 95 |
| Average load (kN) | 43 | 43 | 48 | 45 | 36 | 34 |
| Maximum load/Average load | 5.88 | 3.57 | 2.78 | 2.38 | 2.70 | 2.78 |
| Curve No. | FIG. 4-j | FIG. 4-a | FIG. 4-b | FIG. 5-c | FIG. 5-d | FIG. 5-e |

As is apparent from Table 1, where the top and bottom walls have the same thickness as the connection rib, the ratio of maximum load to average load is the lowest when the radius of curvature R is 20 mm, which is approximately one half of that obtained with no radius of curvature R. If the radius of curvature R is imparted in the range of 5–40 mm, the ratio of maximum load to average load becomes low, and it can be expected that the lower the ratio of maximum load to average load, the less the risk of injury to automobile occupants.

Experiment results obtained by varying the thicknesses of the top and bottom walls and the connection rib as in the second embodiment and of the comparative example are summarized in Table 2.

TABLE 2

|  | $t_1 = t_2$ (mm) | | | | |
| --- | --- | --- | --- | --- | --- |
|  | 2.6 | 2.6 | 2.6 | 2.2 | 1.8 |
|  | $t_5$ (mm) | | | | |
|  | 2.6 | 2.2 | 1.8 | 2.6 | 2.6 |
|  | Radius of curvature R (mm) | | | | |
|  | 20 | 20 | 20 | 20 | 20 |
| Maximum load (kN) | 106 | 91 | 74 | 104 | 101 |
| Average load (kN) | 45 | 39 | 34 | 39 | 34 |
| Maximum load/Average load | 2.38 | 2.32 | 2.17 | 2.63 | 2.94 |
| Curve No. | FIG. 6-c | FIG. 6-f | FIG. 6-g | FIG. 7-h | FIG. 7-i |

As is apparent from Table 2, it is effective for lowering the maximum load generated in a collision for the connection rib to be made thinner than the top and bottom walls.

Third Embodiment

Figure 8:
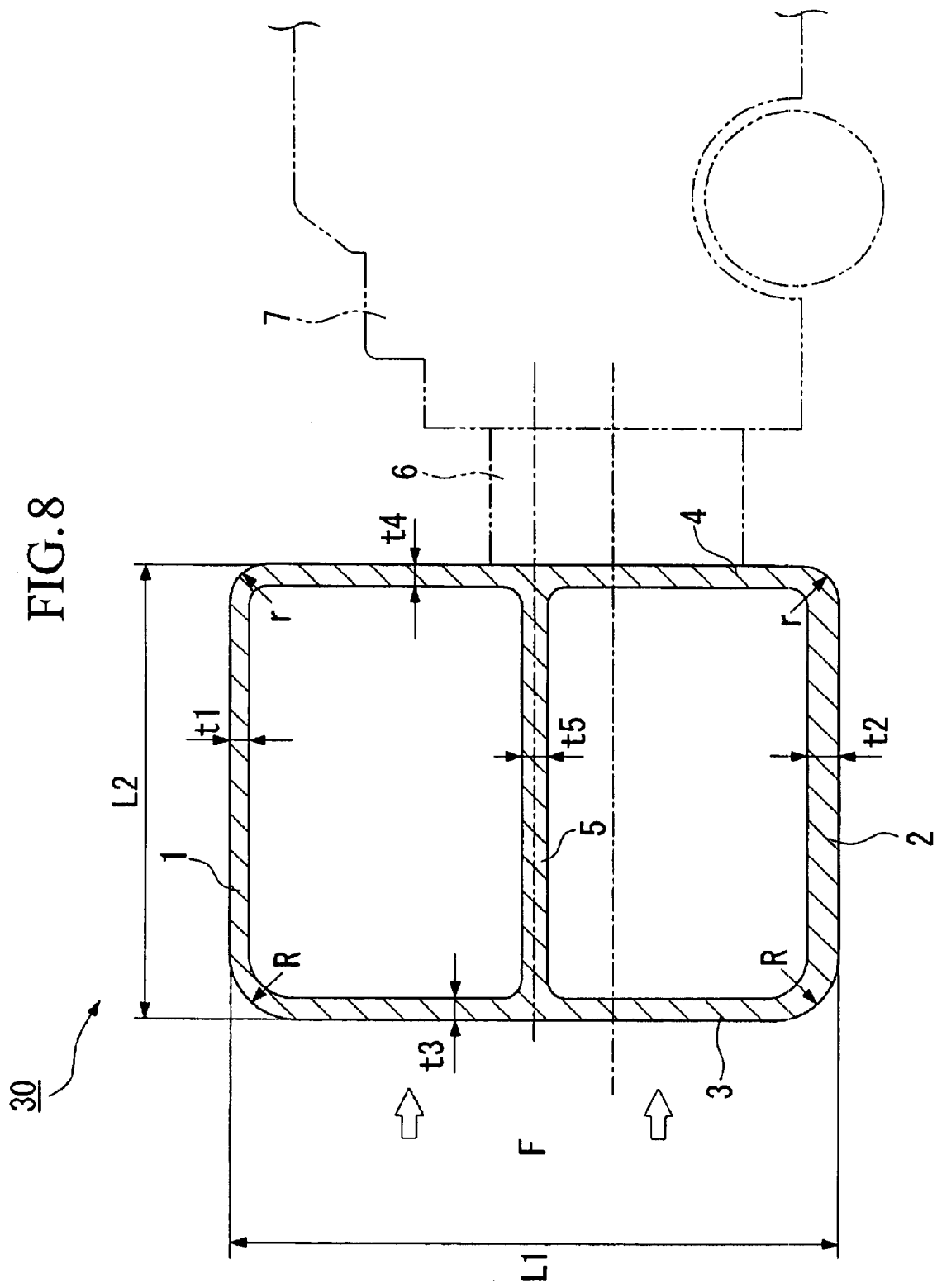
FIG. 8 is view showing a cross sectional view of an automotive bumper beam according to a third embodiment of the present invention.

FIG. 8 shows a bumper beam according to a third embodiment of the present invention. As shown in the figure, the bumper beam 30 of this embodiment has a "two-adjacent-square" cross-sectional shape and is comprised in cross section of a top wall 1, a bottom wall 2 opposed to the top wall 1, a pair of lateral walls 3 and 4 connecting the top and bottom walls 1 and 2 at opposite ends, and a connection rib 5 provided intermediate between the top and bottom walls 1 and 2 to interconnect the pair of lateral walls 3 and 4, so as to secure rigidity. In the bumper beam 30, the lateral wall 3 on the left in the figure is the collision-surface side lateral wall, and an impact force is applied thereto in a collision as indicated by an arrow. The lateral wall 4 on the right in the figure is the vehicle-mounted-surface side lateral wall and mounted through a side member 6 on an automobile body 7.

In the bumper beam of the present embodiment, the thickness $t_3$ of the collision-surface side lateral wall 3 is greater than the thickness $t_4$ of the vehicle-mounted-surface side lateral wall 4, and the thicknesses $t_1$, $t_5$ and $t_2$ of the top wall 1 connection rib 5 and bottom wall 2 become gradually greater in this order. In other words, in FIG. 8, $t_4 < t_3$ and $t_1 < t_5 < t_2$.

In this case, with the thickness $t_2$ of the bottom wall 2 used as the reference, it is preferable that the thickness $t_1$ of the top wall 1 be 0.80 or more and less than 0.9 of the thickness $t_2$ of the bottom wall 2, and the thickness $t_5$ of the connection rib 5 is 0.90 or more and less than 1.0 of the thickness $t_2$ of the bottom wall 2. In other words, it is preferable to set them approximately as follows.

$$0.8 \times t_2 \leq t_1 < 0.9 \times t_2 \quad (5)$$

$$0.9 \times t_2 \leq t_5 < 1.0 \times t_2 \quad (6)$$

The reason for the above is that, in designing automobiles, the bumper beam and the side member do not necessarily have their center lines aligned with each other, and that the center line of the bumper beam is often located at a position higher than the center line of the side member. In such cases, because a lower portion in cross section of the bumper beam receives a stronger impact energy, it is advantageous to reinforce the lower portion.

Furthermore, both corners at the upper and lower ends of the collision-surface side lateral wall 3 are curved with a radius of curvature R that is 0.05–0.3 of the length $L_1$ of the lateral wall 3. In other words, it is set as follows:

$$R = (0.05-0.3) \times L_1 \quad (7)$$

Regarding the radius of curvature r for both corners at opposite ends of the vehicle-mounted-surface side lateral wall 4, because of this side being free of direct impact and in consideration of working accuracy of material, a small radius of curvature on the order of the wall thickness of the lateral wall 4 will suffice so as to avoid fragility resulting from the effect of a notch. In other words, it may be set as follows.

$$r = (0.6-2.0) \times t_4 \quad (8)$$

With the thus constructed bumper beam, the peak of the maximum load that is generated at the moment of collision may be effectively lowered, and collision energy may be absorbed by the bumper beam without damaging the side member, thereby markedly lessening injuries to automobile occupants.

Figure 9:
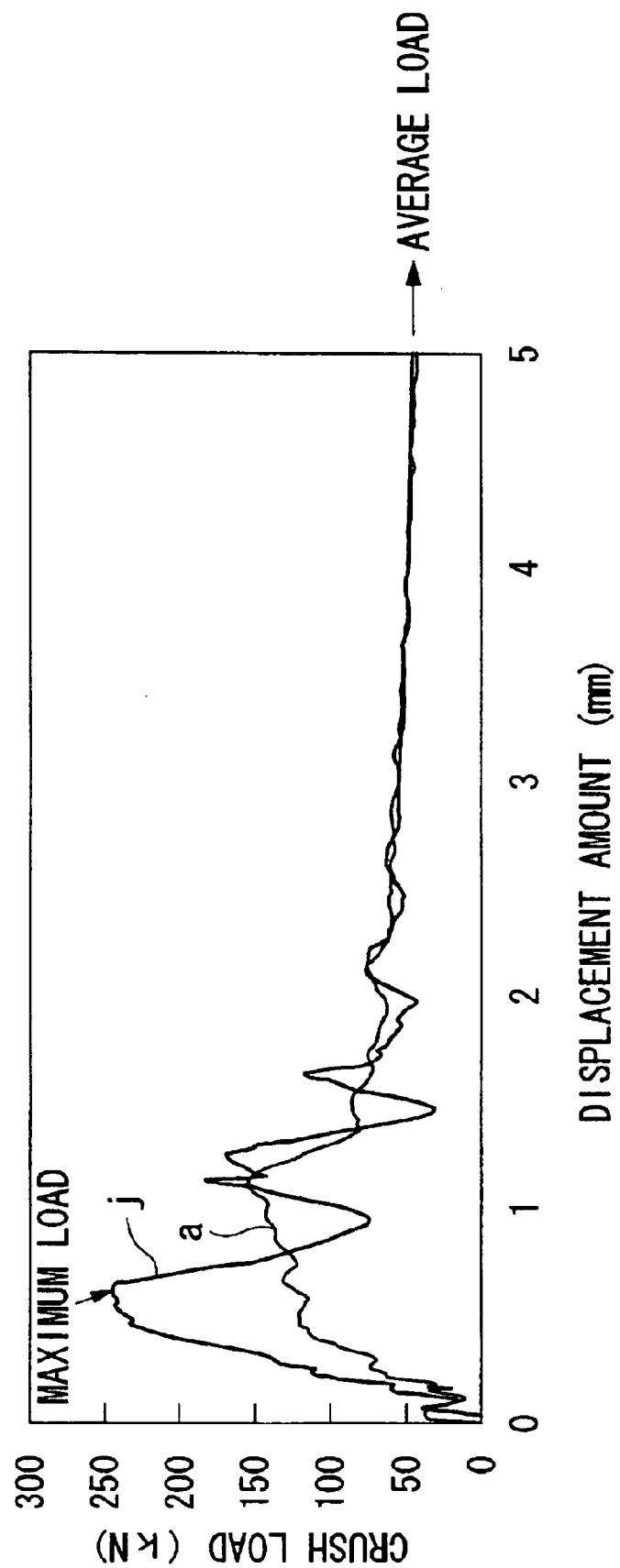
FIG. 9 is a view typically showing a relationship between the amount of displacement of a bumper beam according to the third embodiment of the present invention and crush load.
Figure 14:
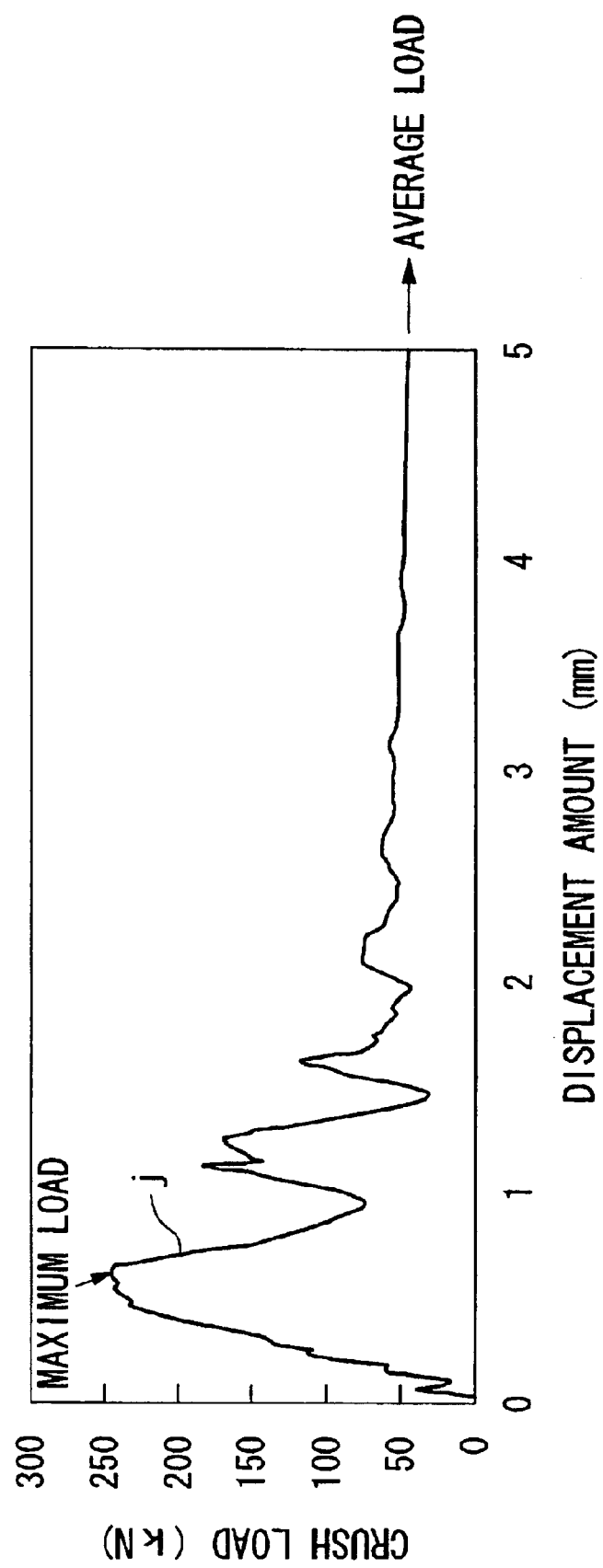
FIG. 14 is a view showing a relationship between the amount of displacement of the conventional automotive bumper beam as shown in FIG. 12 and crush load.

FIG. 9 shows a collision experiment result with a bumper beam having the cross-sectional shape as shown in FIG. 8 and illustrates a relationship between amount of displacement of the bumper beam and crush load. As shown in the figure, the maximum load was generated before the amount of displacement immediately after a collision reached 1 mm, and thereafter the bumper beam undergoes gradual deformation under substantially a constant crush load. The thick curve j in FIG. 9, as in FIG. 14, is the displacement amount curve obtained with the bumper beam of "two-adjacent-square" cross section, in which the radius of curvature R at opposite ends of the collision-surface side lateral wall was 0 (with no radius of curvature R) and indicates that the maximum load of 250 kN was generated when the amount of displacement was approximately 0.5 mm. In contrast, the thin curve a is for a bumper beam of the present embodiment having the radius of curvature R of 10 mm and indicates that a greatly lowered maximum load of approximately 150 kN was generated when the amount of displacement was approximately 1 mm. The curve is made closer to a rectangular wave form.

Thus, by imparting the radius of curvature R to both ends of the collision-surface side lateral wall of the bumper beam of "two-adjacent-square" cross section, the maximum load that is generated at the time of collision is markedly reduced, and collision energy is effectively absorbed by the bumper beam without damaging the side member, which is very significant in securing safety of automobile occupants.

Fourth Embodiment

Figure 10:
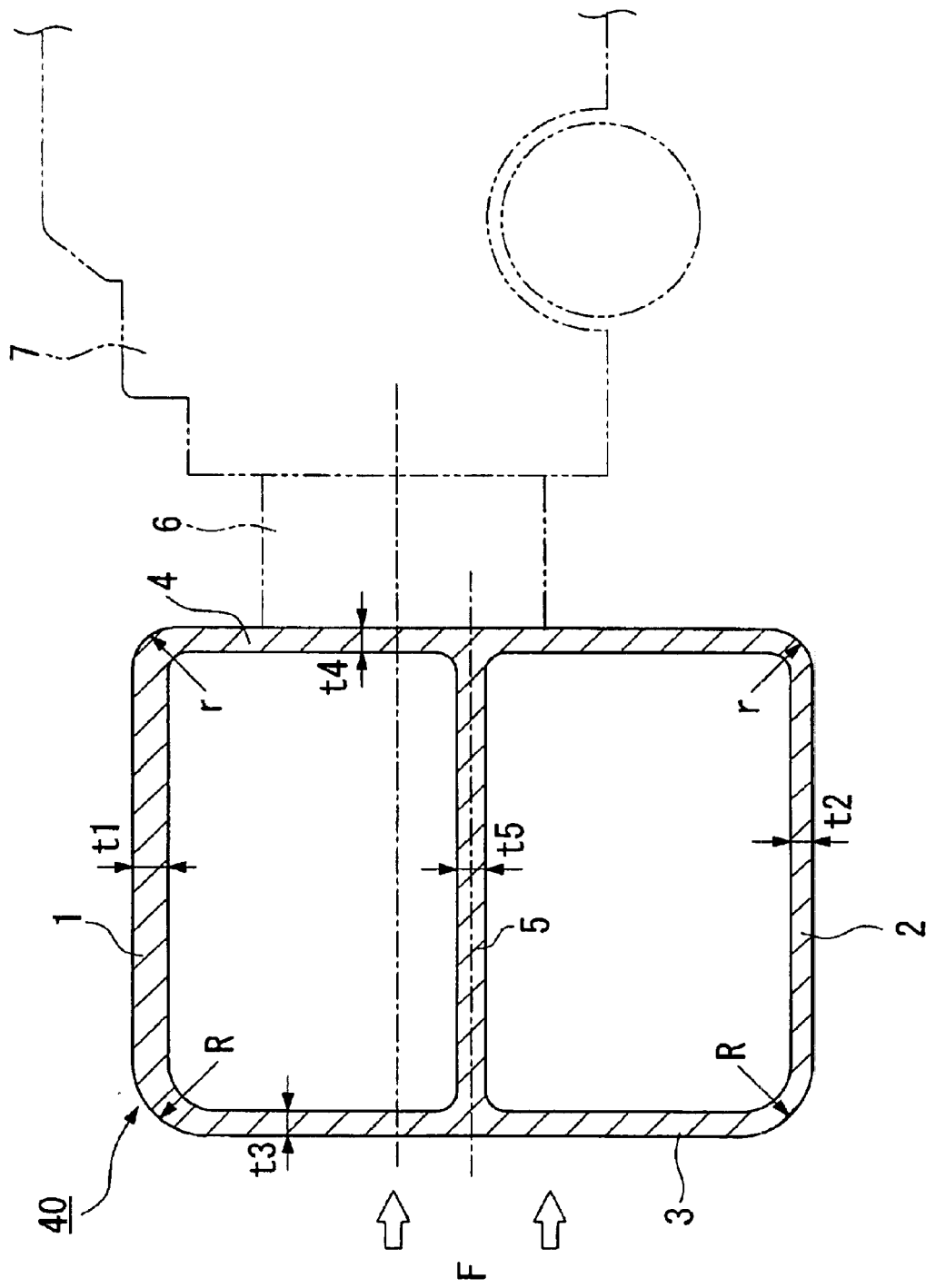
FIG. 10 is view showing a cross sectional shape of an automotive bumper beam according to a fourth embodiment of the present invention.

A fourth embodiment will now be shown in FIG. 10, in which the center line of a bumper beam does not coincide with, and is located at a position lower than, the center line of a side member.

In this case, construction may be such that that the thickness $t_3$ of the collision-surface side lateral wall 3 is greater than the thickness $t_4$ of the vehicle-mounted-surface side lateral wall 4, and the thicknesses $t_1$, $t_5$ and $t_2$ of the top wall 1, connection rib 5 and bottom wall 2, respectively, become smaller in a stepwise manner in this order. In other words, in FIG. 10 $t_4 < t_3$ and $t_2 < t_5 < t_1$. More specifically, with the thickness $t_1$ of the top wall 1 used as the reference, it is preferable that the thickness $t_5$ of the connection rib 5 be 0.9 or more and less than 1.0 of the thickness $t_1$ of the top wall 1, and the thickness $t_2$ of the bottom wall 2 be 0.8 or more and less than 0.9 of the thickness $t_1$ of the top wall 1. In other words, the following are preferably employed.

$$0.9 \times t1 \leq t5 < 1.0 \times t1 \quad (9)$$

$$0.8 \times t1 \leq t2 < 0.9 \times t1 \quad (10)$$

Furthermore, as in the third embodiment, both corners at opposite ends of the collision-surface side lateral wall 3 are curved with a radius of curvature R of 0.05–0.3 of the length $L_1$ of the lateral wall 3. In addition, both corners at opposite ends of the vehicle-mounted-surface side lateral wall 4 are preferably curved with a radius of curvature r of 0.2–0.4 of the thickness $t_4$ of the lateral wall 4.

By thus constructing the bumper beam, the maximum load generated at the time of collision may be greatly lowered by the effect of the radius of curvature R provided at both corners at opposite ends of the collision-surface side lateral wall of the bumper beam.

Fifth Embodiment

Figure 11:
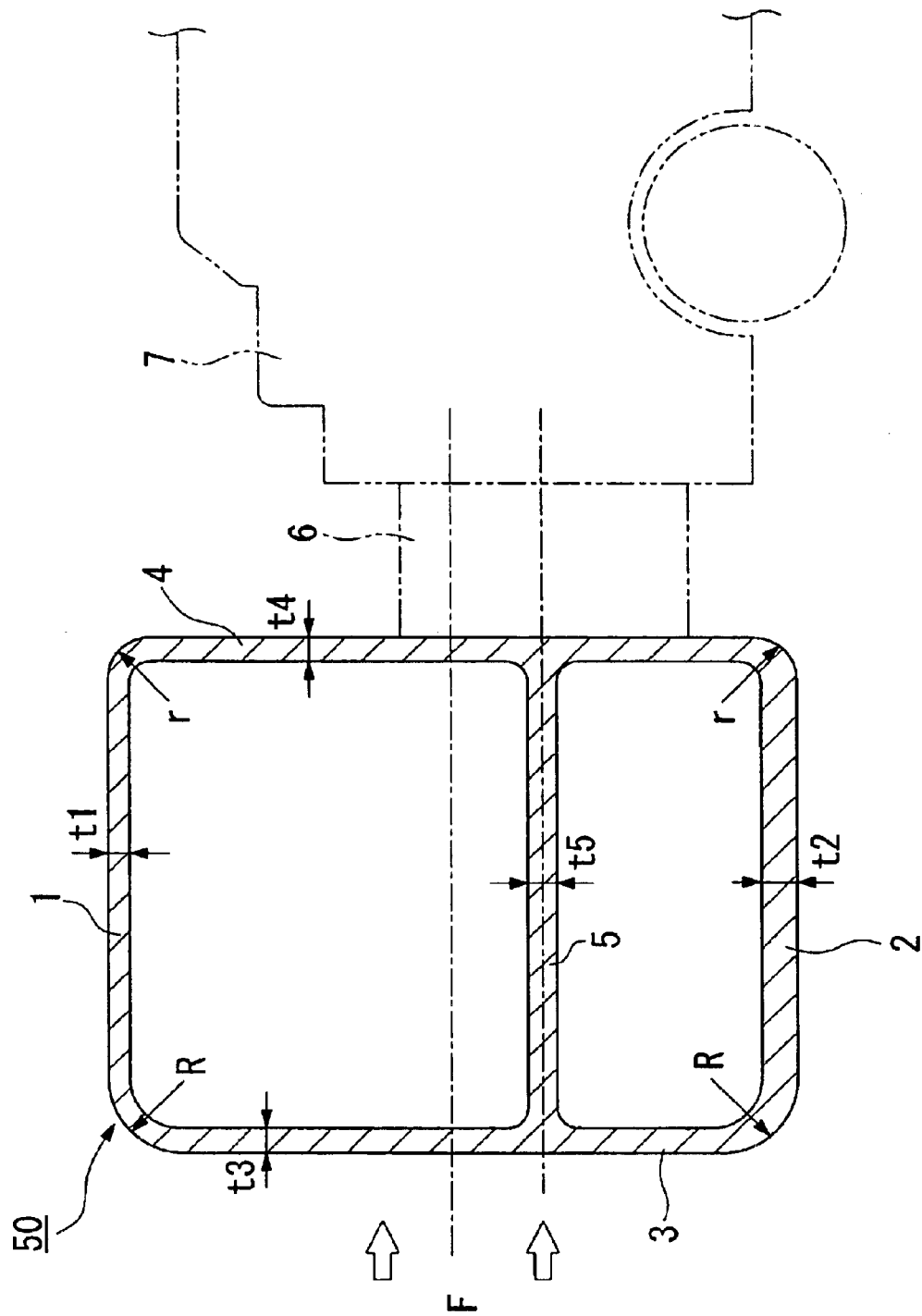
FIG. 11 is view showing a cross sectional shape of an automotive bumper beam according to a fifth embodiment of the present invention.
Figure 12:
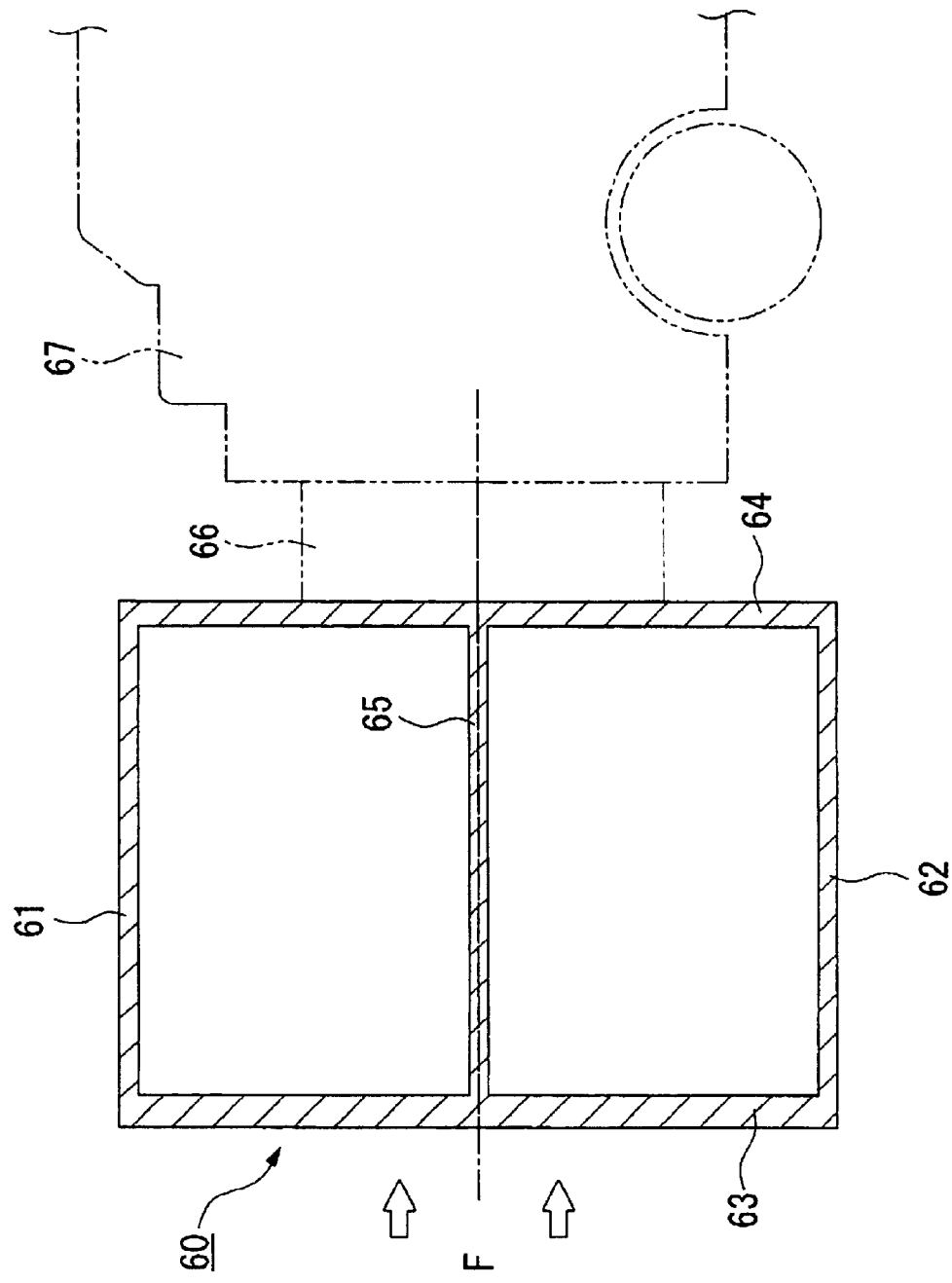
FIG. 12 is a view showing an example of a cross sectional shape of a conventional automotive bumper beam.
Figure 13:
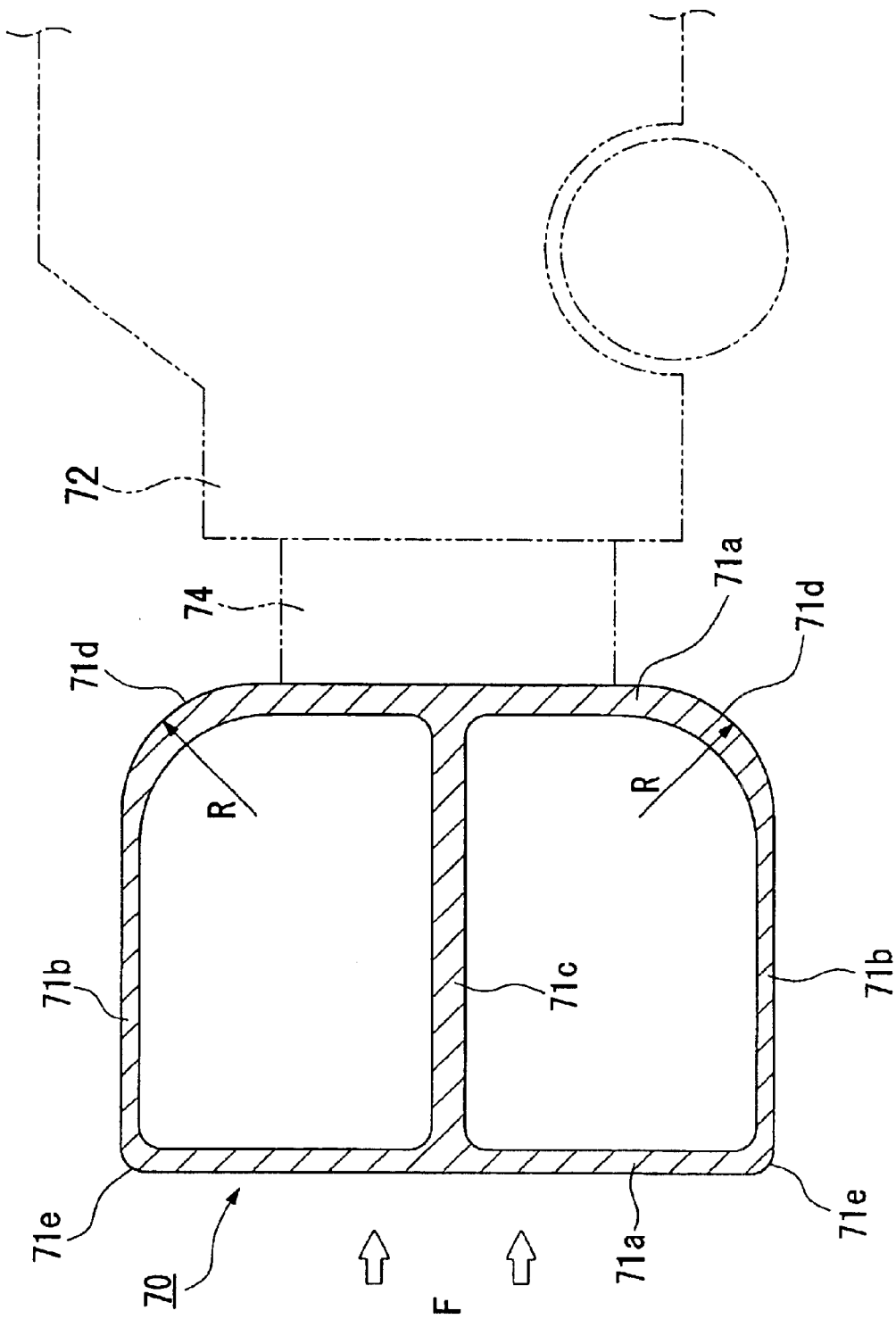
FIG. 13 is a view showing another example of a cross sectional shape of another conventional automotive bumper beam.

A fifth embodiment will next be shown in FIG. 11, in which the center line of a bumper beam does not coincide with and is located at a position higher than the center line of a side member. As shown in cross section in FIG. 11, as a means to reinforce a bottom portion of the bumper beam, the connection rib 5 is provided at a position toward the bottom wall 2 rather than at an intermediate height of the opposing collision-surface side and vehicle-mounted-surface side lateral walls 3 and 4. Considering the amount by which the center lines of the bumper beam 50 and the side member 6 are displaced from each other and from a viewpoint of strength of the bumper beam 50, the connection rib 5 may preferably be provided at one third of the height of the collision-surface side and the vehicle-mounted-surface side lateral walls 3 and 4 from the bottom.

In this case as well, as in the preceding third and fourth embodiments construction may be such that the thickness $t_3$ of the collision-surface side lateral wall 3 is greater than the thickness $t_4$ of the vehicle-mounted-surface side lateral wall 4, and the thicknesses $t_1$, $t_5$ and $t_2$ of the top wall 1, connection rib 5 and bottom wall 2, respectively, become gradually greater in this order. Furthermore, both corners at opposite ends of the collision-surface side lateral wall 3 are formed with a radius of curvature R of 0.05–0.3 of the length $L_1$ of the collision-surface side lateral wall 3. In addition, both corners at opposite ends of the vehicle-mounted-surface side lateral wall 4 are preferably curved with a radius of curvature r of 0.2–0.4 of the thickness $t_4$ of the vehicle-mounted-surface side lateral wall 4.

By thus constructing the bumper beam, the maximum load generated at the time of collision may be greatly lowered by the effect of the radius of curvature R provided at both corners at opposite ends of the collision-surface side lateral wall 3.

Advantages of the Invention

According to the present invention, as a result of studies on cross-sectional shapes of bumper beams, an impact-receiving member of a bumper beam is thickened to increase rigidity, and a radius of curvature R is imparted to opposite ends of the impact-receiving member. Owing to the above, the maximum load generated immediately after deformation of the bumper beam in a collision is lowered, thereby lessening possible physical injuries to occupants of an automobile.

An automobile installed with a bumper beam of the present invention can be said to be one that provides a greater safety.

Having now fully described the invention, it will be apparent to one of ordinary skill in the art that many changes and modifications can be made thereto without departing from the spirit and scope of the invention as set forth in the appended claims.

What is claimed is:

1. A bumper beam for an automobile comprising in cross section:
    a top wall;
    a bottom wall opposed to said top wall;
    a pair of lateral walls connecting said top wall and said bottom wall at opposite ends, one of said pair of lateral walls being a collision-surface side lateral wall and the other being a vehicle-mounted-surface side lateral wall, and
    a connection rib provided intermediate between said top wall and said bottom wall and connecting said pair of lateral walls,
    wherein a thickness of said collision-surface side lateral wall is greater than a thickness of said vehicle-mounted-surface side lateral wall, and
    wherein both corners at opposite ends of said collision-surface side lateral wall are curved with a radius of curvature R of 0.1–0.3 of a length of said collision-surface side lateral wall, and both corners at opposite ends of said vehicle-mounted-surface side lateral wall are curved with a radius of curvature r of 0.6–2.0 of the thickness of said vehicle-mounted-surface side lateral wall.

2. The bumper beam according to claim 1, wherein said length of said collision-surface side lateral wall is smaller than twice a length of said top wall and said bottom wall.

3. A bumper beam for an automobile comprising in cross section:
    a top wall;
    a bottom wall opposed to said top wall;
    a pair of lateral walls connecting said top wall and said bottom wall at opposite ends, one of said pair of lateral walls being a collision-surface side lateral wall and the other being a vehicle-mounted-surface side lateral wall, and
    a connection rib provided intermediate between said top wall and said bottom wall and connecting said pair of lateral walls,
    wherein a thickness of said collision-surface side lateral wall is greater than a thickness of said vehicle-mounted-surface side lateral wall, and
    wherein both corners at opposite ends of said collision-surface side lateral wall are curved with a radius of curvature R of 0.2–0.6 of a length of said bottom wall, and both corners at opposite ends of said vehicle-mounted-surface side lateral wall are curved with a radius of curvature r of 0.6–2.0 of the thickness of said vehicle-mounted-surface side lateral wall.

4. The bumper beam according to claim 3, wherein a length of said collision-surface side lateral wall is greater than twice a length of said top wall and said bottom wall.

5. The bumper beam according to claim 1 or 3, wherein said top wall, said bottom wall and said connection rib are substantially equal in thickness.

6. The bumper beam according to claim 1 or 3, wherein a thickness of said connection rib is 0.6–1.0 of a thickness of said bottom wall.

7. The bumper beam according to claim 1 or 3, wherein said radius of curvature R of said both corners at opposite ends of said collision-surface side lateral wall is 10–30 mm.

8. A bumper beam for an automobile comprising in cross section:
    a top wall;
    a bottom wall opposed to said top wall;
    a pair of lateral walls connecting said top wall and said bottom wall at opposite ends, one of said pair of lateral walls being a collision-surface side lateral wall and the other being a vehicle-mounted-surface side lateral wall, and
    a connection rib provided intermediate between said top wall and said bottom wall and connecting said pair of lateral walls,
    wherein a thickness of said collision-surface side lateral wall is greater than a thickness of said vehicle-mounted-surface side lateral wall,
    wherein thicknesses of said top wall, said connection rib and said bottom wall become gradually greater or smaller in this order, and
    wherein both corners at opposite ends of said collision-surface side lateral wall are curved with a radius of curvature R of 0.05–0.3 of a length of said collision-surface side lateral wall.

9. The bumper beam according to claim 8, wherein the thickness of said top wall is 0.8 or more and less than 0.9 of the thickness of said bottom wall, and the thickness of said connection rib is 0.9 or more and less than 1.0 of the thickness of said bottom wall.

10. The bumper beam according to claim 8, wherein the thickness of said bottom wall is 0.8 or more and less than 0.9 of the thickness of said top wall, and the thickness of said connection rib is 0.9 or more and less than 1.0 of said top wall.

11. The bumper beam according to claim 8, wherein both corners at opposite ends of said vehicle-mounted-surface side lateral wall are curved with a radius of curvature r of 0.2–0.4 of the thickness of said vehicle-mounted-surface side lateral wall.

12. The bumper beam according to claim 8, wherein said thicknesses of said top wall, said connection rib and said bottom wall become gradually greater in this order, and wherein said connection rib is provided off-centered toward said bottom wall.

13. The bumper beam according to claim 8, wherein said thicknesses of said top wall, said connection rib and said bottom wall become gradually smaller in this order, and wherein said connection rib is provided off-centered toward said top wall.

14. The bumper beam according to claim 1, 3 or 8 wherein said bumper beam comprises an extrusion of an aluminum alloy.

* * * * *